Sept. 24, 1929.  T. ANTHONI  1,729,499

SHAFT HANGER AND BEARING

Filed Feb. 11, 1928

WITNESSES
Francis R. Harris
Hugh H. Ott

INVENTOR
Theodor Anthoni
BY
ATTORNEY

Patented Sept. 24, 1929

1,729,499

UNITED STATES PATENT OFFICE

THEODOR ANTHONI, OF BOGOTA, NEW JERSEY

SHAFT HANGER AND BEARING

Application filed February 11, 1928. Serial No. 253,617.

This invention relates to a shaft hanger and bearing and comprehends a shaft hanger which includes mating casing sections each fashioned from a single sheet of material, with one section having its edges rolled over to secure the other section in mated relation thereto, whereby the hanger sections house and retain axially assembled ball race sections and ball bearings against axial separation.

The outstanding object of the present invention is to provide a shaft hanger and bearing which is extremely simple, light and rugged in its construction, which is inexpensive to produce, and which is highly efficient in its purpose.

With the above recited and other objects in view, reference is had to the following description and accompanying drawings in which there is exhibited one example or embodiment of the invention while the appended claims define the actual scope of the invention.

Figure 1:
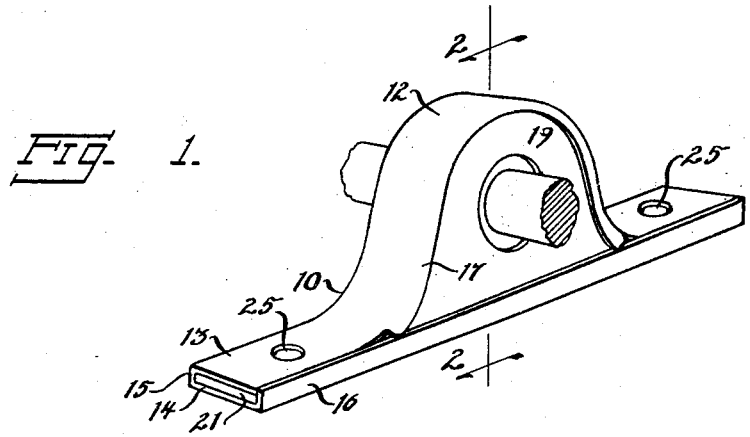
Figure 1 is a perspective view of the completed shaft hanger and bearings.
Figure 2:
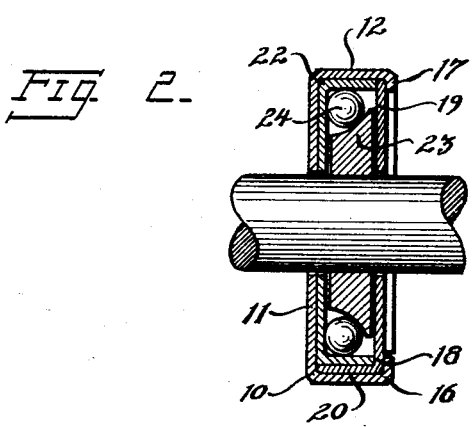
Fig. 2 is a sectional view therethrough taken approximately on the line 2—2 of Fig. 1.
Figure 3:
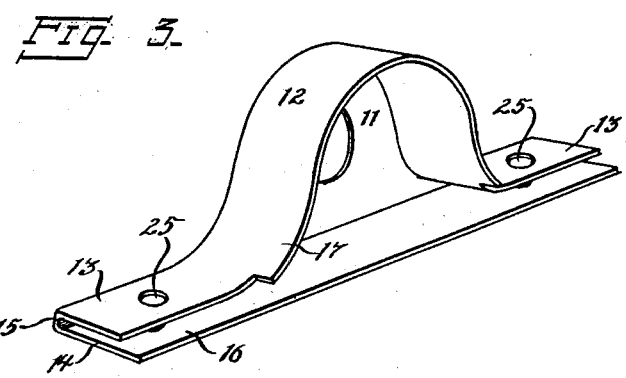
Fig. 3 is a respective view of the main casing section prior to the insertion of the bearing and the assembly of the cover section therewith.

Referring to the drawings by characters of reference, the shaft hanger includes a main casing section or body 10 having a vertical substantially semi-circular wall 11 formed with a marginal flange 12 having portions 13 extending laterally beyond the vertical wall 11. The main casing section or body 10 is further provided with a horizontal right-angularly disposed base wall 14 of a length to provide portions extending laterally beyond the wall 10, underlying and spaced from the portions 13 of the flange 12 and joined thereto by a bight 15. The base wall 14 is of a greater width than the portions 13 of the flange 12 to provide a protruding edge 16. The semi-circular portion of the marginal flange is provided with a protruding portion 17 and corresponds in width to the width of the base wall 14. The casing cover section designated generally by the reference character 18, is formed with a vertical substantially semi-circular wall 19 and a right-angularly disposed base flange 20, having portions 21 extending laterally beyond the vertical wall 19 and adapted to fit between the flanged portion 13 and the base wall 14 after which the protruding edges 16 and 17 are rolled inwardly to retain the casing sections in mated relation.

Prior to the assembly of the casing sections, a bearing is arranged within the main casing section or body 10, said bearing consisting of a cup-shaped race element 22 and a conical race element 23 between which ball bearings 24 are arranged. The race elements are axially associated to retain the ball bearings in place in the usual manner and it is obvious that when the casing sections are mated and assembled with the protruding edges rolled, separation of the race elements of the bearing is prevented.

For the purpose of attaching the hanger to a support, the protruding portions of the flanges 12 and 20 and of the base wall 14, are provided with alined apertures 25 through which screws, bolts or other fastening devices are adapted to be inserted. The fastening elements further serve as a means for assuming axial thrusts which tend to separate the casing sections, thereby relieving to some extent, strains on the rolled protruding edges 16 and 17.

From the foregoing it will thus be seen that a simple, inexpensive, yet strong and durable shaft hanger has been devised.

What is claimed is:

1. A shaft hanger, including a pair of telescopically associated casing sections, each fashioned from a single sheet of material to provide when associated longitudinally spaced apertured end walls and laterally projecting portions adapted to overlap and receive therethrough a common means for attaching the hanger to a support and for holding the sections against relative separation.

2. The combination with a ball bearing having axially assembled ball race elements, of a shaft hanger including a pair of telescopically associated mating casing sections within which the ball bearing is housed and between the sections of which the race elements are held against axial separation, each of said casing sections fashioned from a single sheet of material, to include laterally projecting portions adapted to receive therethrough a common means for attaching the hanger to a support and for holding the sections against axial separation, one section of which has its edges rolled over to secure the other section in mated relation prior to the attachment of the same to its support.

3. A shaft hanger, including a ball bearing having axially assembled ball race elements, a pair of telescopically associated mating casing sections within which the bearing is housed and between the sections of which the race elements are held against axial separation, each of said casing sections fashioned from a single sheet of material, with the edges of one section rolled over the other section to secure said sections in mated relation and laterally projecting overlapped portions of said sections adapted to receive therethrough a common means for attaching the hanger to a support and for relieving the rolled edges of axial thrusts.

4. A shaft hanger and bearing housing, including a pair of mating casing sections, one of which is provided with a vertical substantially semi-circular wall and a right-angularly disposed base flange having portions extending laterally beyond the vertical wall, the other of said sections including a substantially semi-circular wall having a marginal flange with portions extending laterally beyond the vertical wall and a right-angularly disposed base flange having portions extending laterally beyond the vertical wall and in spaced parallel relation to the laterally extending portion of the marginal flange, the edges of the semi-circular portion of the flange and the edges of the base wall of said second section being rolled over to secure the sections in mated relation.

5. A shaft hanger and bearing housing, including a pair of mating casing sections, one of which is provided with a vertical substantially semi-circular wall and a right-angularly disposed base flange having portions extending laterally beyond the vertical wall, the other of said sections including a substantially semicircular wall having a marginal flange with portions extending laterally beyond the vertical wall and a right-angularly disposed base flange having portions extending laterally beyond the vertical wall and in spaced parallel relation to the laterally extending portion of the marginal flange, the edges of the semi-circular portion of the flange and the edges of the base wall of said second section being rolled over to secure the sections in mated relation, the said laterally extending portions of the base flange, the marginal flange, and the base wall being apertured to receive attaching elements which also constitute means for relieving the rolled edges of axial thrusts and strains.

6. A shaft hanger and bearing housing including a pair of mating sections, one of which is provided with a wall and a right angularly disposed base flange having portions extending laterally beyond the wall, the other of which sections includes a complementary wall having a marginal flange with portions extending laterally beyond its wall and a right angularly disposed base flange having portions extending laterally beyond its wall and in spaced relation to the laterally extending portion of the marginal flange with the edges of the flange and the edges of the base of said second section rolled over to secure the first section in mated relation to the second section.

Signed at New York, in the county of New York and State of New York, this 10th day of February, 1928.

THEODOR ANTHONI.